W. F. TOSCH.
LAWN MOWER.
APPLICATION FILED NOV. 24, 1916.
1,275,798.
Patented Aug. 13, 1918.
2 SHEETS—SHEET 1.
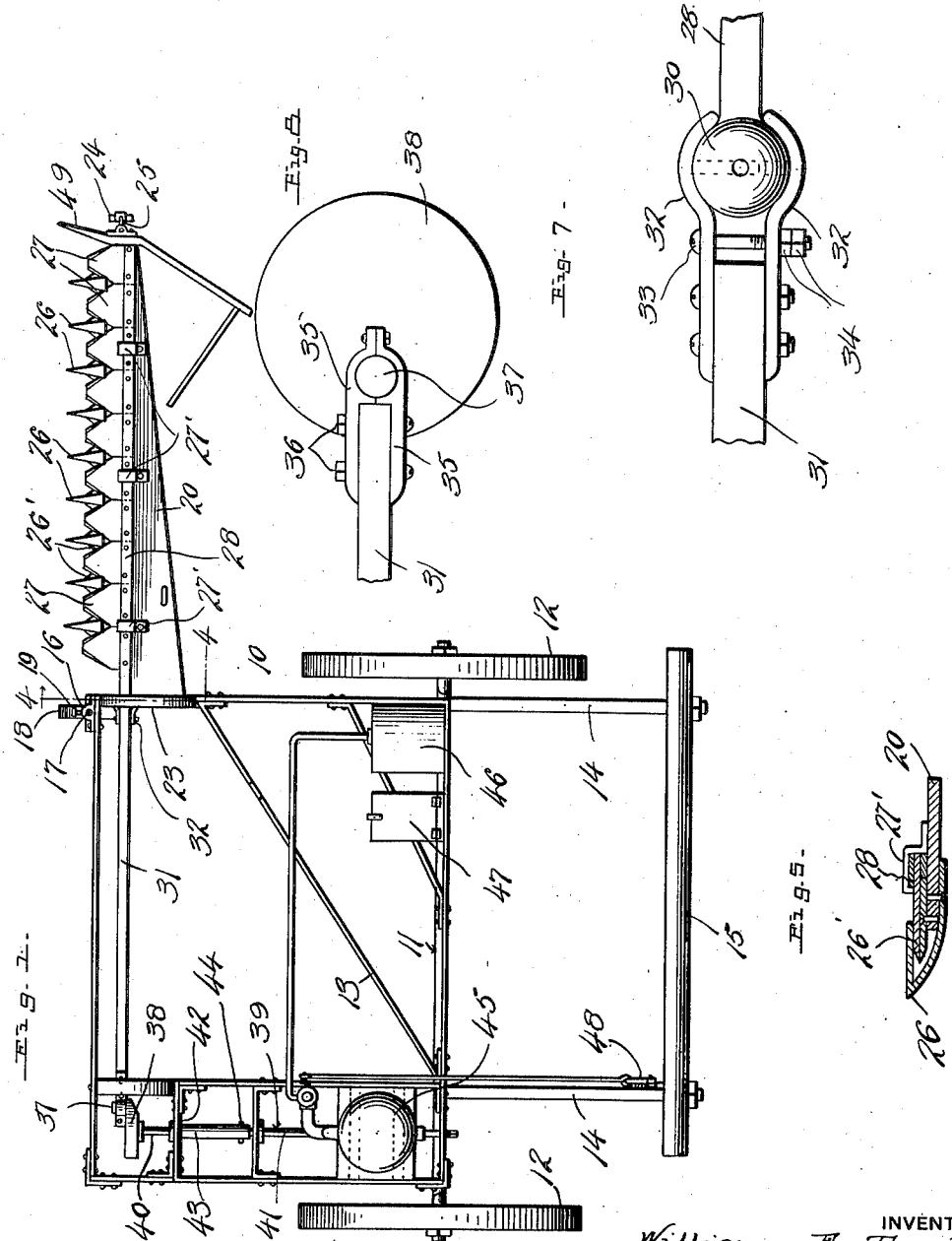
INVENTOR
William F. Tosch.
WITNESSES
BY
ATTORNEY W. F. TOSCH.
LAWN MOWER.
APPLICATION FILED NOV. 24, 1916.
1,275,798.
Patented Aug. 13, 1918.
2 SHEETS—SHEET 2.
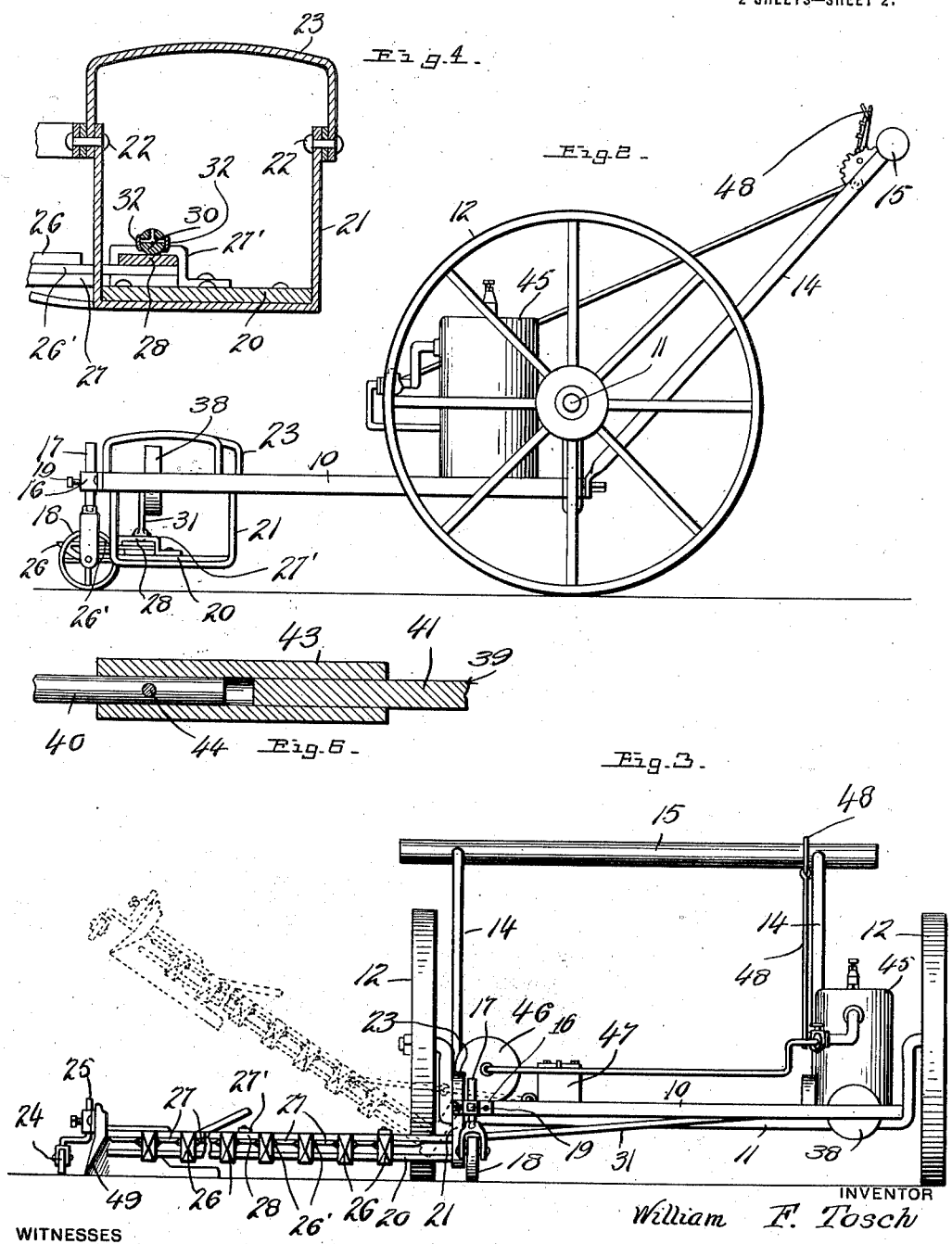
WITNESSES
INVENTOR
William F. Tosch
BY
ATTORNEY

UNITED STATES PATENT OFFICE.

WILLIAM F. TOSCH, OF KANSAS CITY, MISSOURI.

LAWN-MOWER.

1,275,798.

Specification of Letters Patent.  Patented Aug. 13, 1918.

Application filed November 24, 1916. Serial No. 133,216.

*To all whom it may concern:*

Be it known that I, WILLIAM F. TOSCH, a citizen of the United States, residing at Kansas City, in the county of Jackson and State of Missouri, have invented certain new and useful Improvements in Lawn-Mowers, of which the following is a specification.

This invention relates to lawn mowers, and particularly to motor driven mowers.

The invention aims primarily to provide a mowing machine equipped with a motor for driving the cutting mechanism thereof, the mower being adapted to be guided and followed by an operator, and which embodies simplified mechanisms all arranged and coöperating to provide a powerful, positive and efficient machine, capable of attaining high speed, which is easily and quickly steered, and which is equipped with means whereby grass may be cut in various lengths.

A further object is to provide a mower of this character which is equipped with safety mechanism so that engagement of the cutting blades with matter or obstacles heavier than that for which the device is intended, will operate at once to break the connection between the cutting mechanism and the power source.

A still further object is to provide a mowing machine of the character set forth which is arranged and constructed in such manner as to be capable of efficiently operating upon uneven or undulating ground, the device being capable of adapting itself to irregular surfaces.

Still further objects reside in a device of this character which is featured by the lack of expensive and complicated mechanism; which embodies but few simple and readily assembled parts; the various parts being arranged or assembled in such manner as to preclude wear, breakage or derangement; which is capable of being readily taken apart for the purposes of cleaning, sharpening or repair; which is capable of being folded into small compass when not in use; which requires but a small amount of fuel to develop the requisite driving power; and which may be readily controlled by the operator.

With these objects in view, together with others, which will appear as the description proceeds, the invention resides in the novel formation, combination and arrangement of parts, all as will be described more fully hereinafter, illustrated in the drawings, and particularly pointed out in the claim.

In the drawings:—

Figure 1 is a plan view of a mower constructed and arranged in accordance with the invention;

Fig. 2 is a side elevation of the mower illustrated in Fig. 1;

Fig. 3 is a front elevation of the improved mower;

Fig. 4 is a sectional view taken on line 4—4 of Fig. 1;

Fig. 5 is a transverse sectional view taken through the cutting mechanism of the mower;

Fig. 6 is a detail sectional view taken through the engine shaft;

Fig. 7 is a detail view illustrating the means for connecting the knife bar with the pitman; and Fig. 8 is a view in elevation showing the means for connecting the pitman to the drive wheel.

Referring now more particularly to the drawings, 10 indicates the frame of the mower, which consists of a plurality of relatively thin strong metallic bars, connected together in the manner shown to provide a frame work of substantially rectangular formation. The frame includes an axle 11, which is disposed transversely, and is supported at its ends by wheels 12. This axle is of substantially U-shape, the frame being supported upon the bight portion thereof, so as to be relatively close to the ground. A diagonal brace or bar 13 is disposed within the frame so as to lend rigidity and stability to the structure. Projecting rearwardly from the frame are arms 14, the said arms being connected at their outer ends by a handle bar 15, the said handle being adapted to be grasped by the operator to steer or guide the machine.

A guide 16 is secured to the forward end of the vehicle frame, and through which a wheel post 17 extends, the said post having swiveled at its lower end a wheel 18 for supporting the forward end of the frame. A set screw 19 extends through the guide and is adapted to bind against the wheel post, and this construction permits of the said post being adjusted vertically so as to vary the distance of the forward end of the frame from the ground.

Projecting laterally from the vehicle frame at the forward end of the latter, is a finger bar 20. This bar is formed of a relatively thin metallic plate, shaped so as to present a straight front edge parallel with the forward end of the vehicle frame. The finger bar is secured at its inner end to a yoke member 21, the latter having its arms pivoted as at 22 to the side of the frame so as to enable the finger bar to be moved toward and away from the ground. An arched member 23 extends over the inner end of the finger bar 20 at the juncture of the latter with the vehicle frame, so as not to interfere with the movements of the bar, and to permit unimpeded movement of the sickle operating mechanism to be hereafter detailed. The outer extremity of the finger bar is supported by a wheel 24, the latter being carried by a stem 25, mounted for vertical movement in a suitable guide at the end of the said bar. Means may be provided for adjusting the wheel stem within its guide, so as to regulate the distance the finger bar shall assume above the ground.

The finger bar is equipped with the usual forwardly projecting guards 26, within the rearward portion of which and upon the upper face of the bar are secured the ledger plates 27. These plates are attached to the finger bar by means of screws or rivets, and have their inclined edges sharpened as will be readily understood.

Mounted for sliding movement longitudinally of the finger bar and confined beneath the straps 27', is a knife bar 28, the said bar carrying the blades 26' for coöperation with the guard plates 27 to perform a cutting action. The innermost end of the knife bar is equipped with a ball 30 of hard metal, to which one end of a pitman 31 is connected. The pitman is disposed transversely of the frame, and is the instrumentality by which the knife bar is actuated. This pitman is provided at one end with a pair of coupling sections 32, which partially inclose and form a swivel connection with the ball member 30. A clamping bolt 33 extends through the clamp or coupling members adjacent the ball 30, and is provided at its outermost extremity with lock nuts 34, to prevent the parts becoming separated or detached during the operation of the mower. The ball may be provided with suitable apertures through which oil may flow to keep the joint properly lubricated at all times. Obviously, this particular construction permits the pitman to be readily detached from the knife bar when desired.

The opposite end of the pitman is provided with a pair of separable bearing sections 35, secured in proper assembled relation upon the pitman end by means of bolts 36, and which form a pivotal connection for the said end of the pitman with a wrist pin 37 mounted eccentrically upon the outer face of a rotatable disk or wheel 38. This disk is secured upon one end of a sectional power shaft, the latter being indicated generally at 39 and which comprises sections 40 and 41. The section 40 is mounted for rotation in suitable bearings held upon a strut 42, and is equipped at its inner end with a sleeve 43. The shaft 41 is adapted to engage at its forward end within the socket formed by the sleeve or collar 43, and the inclosed end of the shaft 41 is provided with an opening adapted to aline with laterally disposed openings in the sleeve or collar 43, and through which a frangible pin 44 is adapted to be inserted to connect the shaft sections. The shaft 41 may be formed upon the crank shaft of a motor indicated at 45, and which comprises in the present instance an engine of the internal combustion type. This engine is supplied with fluid fuel, such as gasolene, contained within a tank 46, and the ignition for the engine may be supplied by batteries or other suitable sources of electrical energy confined within the box or compartment 47. The speed of the engine may be controlled by manipulation of the lever 48 located upon the handle of the vehicle and within convenient reach of the operator. Initial or starting movement may be imparted to the motor by applying a hand crank to the rearward end of the crank shaft as will be readily understood.

The outer extremity of the finger bar is equipped with a divider 49, which collects the standing grass or weeds lying in the path of travel of the same and draws the latter into engagement with the end teeth of the sickle, and causes the standing stalks to fall inwardly from the end of the cutting mechanism. This divider thus enables the end of the swath cut by the mower to be clearly defined, so that the operator may guide the machine accordingly upon his next trip.

In operation, the wheels 18 and 24 are adjusted in their respective ferrules or clevises to space the cutter above the ground the required distance. A fragile pin, such as one formed of wood, is driven into the alined openings in the ends of the shaft sections, so that a positive driving connection is established between the motor 25 and the cutting mechanism. The engine is then started, whereupon the cutter bar will be reciprocated upon the finger bar. The blades 26' carried by the cutter bar are thus reciprocated across the guard plates 27, and the coöperating sharpened edges of the plates will shear standing stalks which happen to pass between the guards. The speed of the engine may be readily controlled by manipulation of the lever 48. The machine thus operating, is guided and pushed over the lawn or field, and the only exertion required is that to push and guide the vehicle.

Should the teeth or blades of the cutting mechanism engage roots, heavy stalks, stones, wire, or other obstructions which would break or impair the mechanism, the resistance offered by such obstruction to the cutter bar would cause the fragile pin 44 connecting the sectional shaft to break, whereupon the cutting mechanism and the parts immediately associated therewith would become idle, and the engine would run loose. After the obstruction has been removed, the sectional shaft may be again assembled, whereupon the cutting operation may proceed. By reason of the fact that the cutting mechanism is hinged to the frame proper of the vehicle, the said cutting mechanism may move upwardly and downwardly to conform to irregularities in the surface of the field or lawn. The hinged connection between the pitman and knife bar enables the cutting mechanism to oscillate without affecting the driving connection.

When it is desired to move the mower without cutting, the pin 44 may be withdrawn from the shaft sections, or the engine may be halted, and the cutting mechanism swung upon its pivot upwardly, and out of contact with the ground. Flexible links, chains or ropes may be used to maintain the cutting mechanism in upstanding position.

From the foregoing, it is apparent that I have provided an extremely simple and yet thoroughly efficient mower equipment with means for driving its cutting mechanism. The only effort necessary on the part of the operator is steering and pushing the vehicle over the lawn. The device is of exceedingly light weight, being formed of light and yet durable frame bars or rods, and the engine may also be of simple construction and light weight. The various parts of the device are assembled in such manner as will permit the ready dismantling of the mechanism when required for repair, cleaning or adjustment of the elements.

While the present is a disclosure of the preferred embodiment of the invention it is to be understood that the invention is not limited thereto, but that various changes may be made in the construction, arrangement and proportion of parts, without departing from the scope of the invention, as defined in the appended claim.

What is claimed is:—

In a mower, a wheeled frame, a yoke pivoted at the extremities of its arms to said frame and being capable of swinging laterally thereof, a cutting mechanism supported at one end by said yoke, said mechanism including a reciprocable cutter bar, the end of said bar being disposed in said yoke, a ball on the end of said bar, a motor, a pitman connected at one end to said motor, clamp arms on the outer end of said pitman engaging said ball, and a bolt for holding said arms against said ball.

In testimony whereof I affix my signature in presence of two witnesses.

WILLIAM F. TOSCH.

Witnesses:
W. E. MONAHAN,
D. B. HAWORTH.